United States Patent
Reich

(10) Patent No.: US 8,483,911 B2
(45) Date of Patent: Jul. 9, 2013

(54) METHOD AND SYSTEM FOR CONTROLLING VEHICLE STABILITY

(75) Inventor: Thomas Reich, Hannover (DE)

(73) Assignee: WABCO GmbH, Hannover (DE)

( * ) Notice: Subject to any disclaimer, the term of this patent is extended or adjusted under 35 U.S.C. 154(b) by 399 days.

(21) Appl. No.: 12/937,503

(22) PCT Filed: Feb. 24, 2009

(86) PCT No.: PCT/EP2009/001279
§ 371 (c)(1),
(2), (4) Date: Nov. 24, 2010

(87) PCT Pub. No.: WO2009/127291
PCT Pub. Date: Oct. 22, 2009

(65) Prior Publication Data
US 2011/0112723 A1     May 12, 2011

(30) Foreign Application Priority Data

Apr. 17, 2008   (DE) .......................... 10 2008 019 194

(51) Int. Cl.
*G06F 17/00*   (2006.01)
*B62D 6/02*    (2006.01)
*B62D 6/04*    (2006.01)
*B60T 7/12*    (2006.01)

(52) U.S. Cl.
USPC ................. 701/41; 701/48; 701/82; 180/197; 180/282

(58) Field of Classification Search
USPC ................... 701/1, 36, 38, 41, 43, 45, 48, 70, 701/71, 72, 82, 84, 90, 91; 180/170, 197, 180/271, 282; 340/438, 439, 440
See application file for complete search history.

(56) References Cited

U.S. PATENT DOCUMENTS

| | | | | |
|---|---|---|---|---|
| 5,001,636 A | * | 3/1991 | Shiraishi et al. | 701/41 |
| 5,747,683 A | * | 5/1998 | Gerum et al. | 73/117.01 |
| 5,832,402 A | * | 11/1998 | Brachert et al. | 701/72 |

(Continued)

FOREIGN PATENT DOCUMENTS

| | | |
|---|---|---|
| DE | 198 02 041 | 7/1999 |
| DE | 199 07 633 | 10/1999 |
| DE | 101 57 976 | 6/2002 |

OTHER PUBLICATIONS

International Search Report, PCT/EP2009/001279, Mailed Jun. 3, 2009.

*Primary Examiner* — Thomas Tarcza
*Assistant Examiner* — Edward Pipala
(74) *Attorney, Agent, or Firm* — Kramer Levin; Naftalis & Frankel LLP

(57) ABSTRACT

In a method and a device for controlling the stability of a vehicle, in particular a utility vehicle, an anti-tilt control process is carried out in which at least one lateral acceleration signal, one steering wheel angle signal and one vehicle speed signal are sensed and control signals for vehicle interventions are formed therefrom and output, and a yaw control process is carried out during which the steering wheel angle signal, the lateral acceleration signal and the vehicle speed signal are sensed, a yaw rate setpoint value signal and a yaw rate actual value signal are determined and compared with one another and a yaw control process is carried out during which control signals for vehicle interventions are formed and output.

27 Claims, 1 Drawing Sheet

U.S. PATENT DOCUMENTS

| | | | |
|---|---|---|---|
| 5,878,357 A * | 3/1999 | Sivashankar et al. | 701/1 |
| 6,138,066 A * | 10/2000 | Guo et al. | 701/38 |
| 6,349,247 B1 | 2/2002 | Schramm et al. | |
| 6,494,281 B1 | 12/2002 | Faye et al. | |
| 6,668,225 B2 | 12/2003 | Oh et al. | |

* cited by examiner

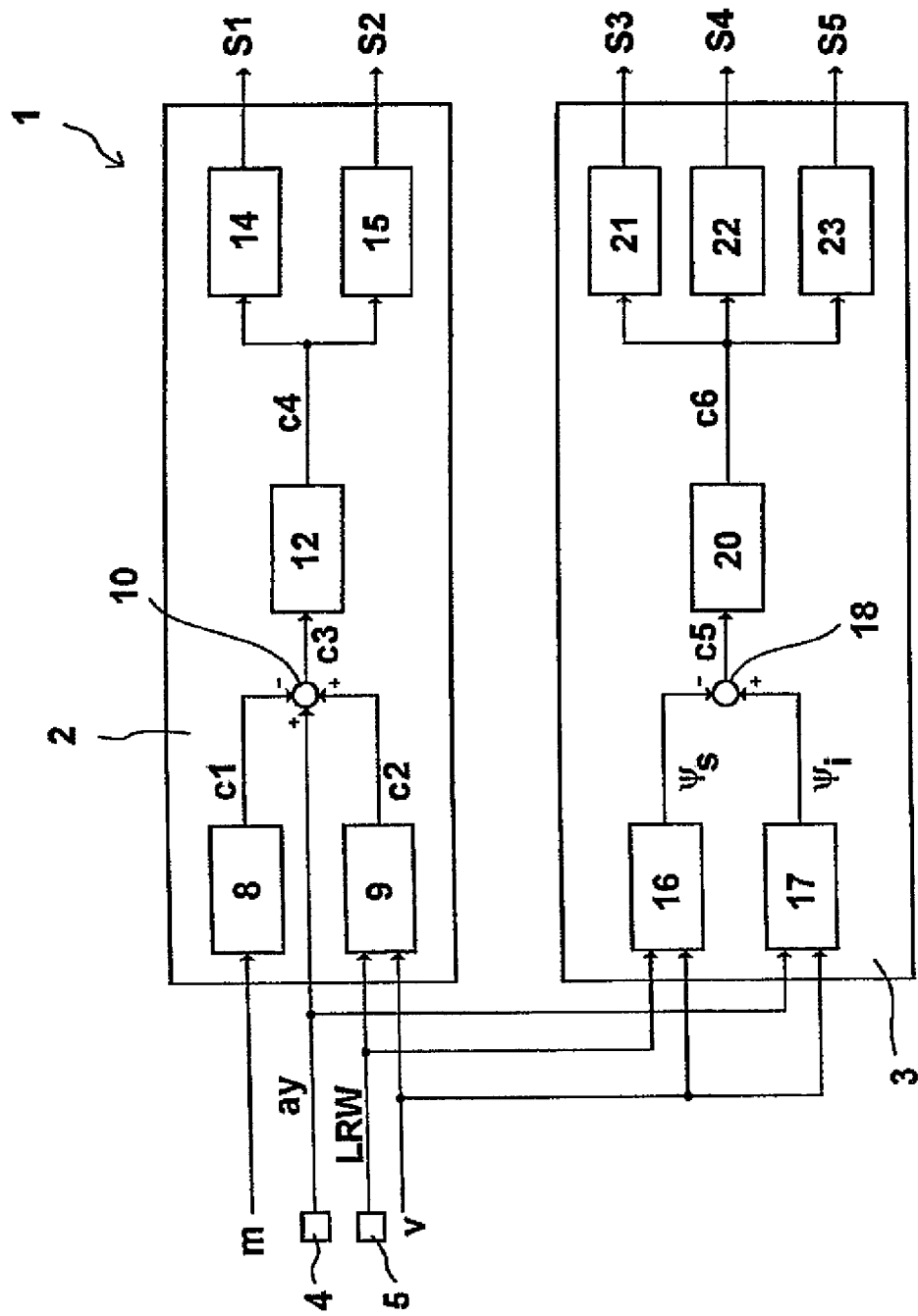

METHOD AND SYSTEM FOR CONTROLLING VEHICLE STABILITY

FIELD OF THE INVENTION

The invention generally relates to embodiments of a method and a device for controlling the stability of a vehicle, in particular a utility vehicle.

BACKGROUND OF THE INVENTION

Vehicle stability control systems serve to intervene in critical situations such as, for example, understeering, oversteering or tilting. Intervention can be accomplished by means of, inter alia, braking interventions, in particular modulation of the brake pressure, so as to assist driving of the vehicle.

Input variables that are used in this context are measurement signals of different sensors, in particular of a yaw rate sensor, steering wheel angle sensor and lateral acceleration sensor as well as, if appropriate, of a longitudinal acceleration sensor. In addition, driving state variables such as, for example, vehicle mass and a reference speed, which are determined by other brake control systems such as ABS or EBS systems, are used to a certain extent.

In utility vehicles, stability control systems are used that have one control circuit for yaw control and a further control circuit for anti-tilt control. The anti-tilt controller generally receives input signals for the lateral acceleration, the vehicle mass and the vehicle reference speed and, if appropriate, a steering wheel angle signal. The yaw controller generally receives the steering wheel angle signal, the vehicle reference speed and the yaw rate signal.

The extensive sensor systems result in corresponding costs both for the hardware of the sensors used and for the software implementation. Furthermore, the sensors, in particular the yaw rate sensor, are susceptible to faults so that a high degree of expenditure on software development is necessary for reliable implementation.

Furthermore, the individual control channels give rise to corresponding costs for the brake system, the yaw controller in this context requiring two individual control channels for the front axle.

SUMMARY OF THE INVENTION

Generally speaking, it is an object of the present invention to provide a method and a device for controlling the stability of a vehicle that permit reliable control of driving stability with relatively little expenditure.

Inventive embodiments include estimating the actual yaw behavior from the measured lateral acceleration, and determining the setpoint yaw behavior from the steering wheel angle signal, and comparing the actual values and setpoint values of the yaw behavior that are acquired in this way. In contrast to conventional systems, with the present invention no specific yaw rate sensor is needed for yaw control in order to output a yaw rate measurement signal.

A lateral acceleration signal is used in any case for anti-tilt control or rolling stability control and this lateral acceleration signal can also be used for limiting the inclination to understeer in the yaw control without an additional yaw rate signal or yaw rate measurement signal. In contrast to conventional anti-tilt controllers, in this context the steering wheel angle sensor is not dispensed with but rather is consciously included not only in the anti-tilt control but also in the yaw control. As a result, a relatively high level of performance, in particular in the case of dynamic manoeuvres, is obtained compared to known anti-tilt control systems or rolling stability control systems without a steering wheel angle sensor.

The method according to embodiments of the invention and the device according to embodiments of the invention are particularly advantageous in vehicles with a large wheel base, for example lorries and buses, since such vehicles tend to understeer in the case of instability at low values of the coefficient of friction. In this context, the inventive embodiments leverage the inventive realization that an understeering intervention by braking the rear wheels on the inside of a bend is very effective while, in contrast, an oversteering intervention by braking the front wheel on the outside of a bend is less effective. In the case of train systems, the method according to embodiments of the invention is relevant in particular for the traction vehicle.

The anti-tilt control process can be carried out, in particular, on all wheels of the traction vehicle and trailer vehicle.

By eliminating the yaw rate sensor, which is very costly in terms of hardware and software and is also susceptible to faults, and by including the steering wheel angle signal and lateral acceleration signal, a cost-effective and nevertheless very reliable, robust system is provided for the anti-tilt control and for the yaw control.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below with reference to the appended drawing of an exemplary embodiment, in which:

FIG. 1 is a block diagram of a stability control system according to an embodiment of the invention.

DETAILED DESCRIPTION OF THE PREFERRED EMBODIMENTS

In the stability control system 1 shown in FIG. 1, an anti-tilt control system 2 and a yaw control system 3 are provided as two control systems with common input signals. The control systems 2 and 3 can be embodied here in terms of software in a common control unit or in two control units that are separated in terms of hardware.

The anti-tilt control system 2 receives as an input signal a vehicle mass signal m. This signal is determined in a known manner by a subordinate brake system (for example an ABS or EBS control system), if appropriate including axle load sensors, as a reference value from the inertia when different accelerations or braking effects are acting. Furthermore, the anti-tilt control system 2 receives a vehicle speed signal v, which is present, for example, in the brake systems of the ABS or EBS system as a reference speed and is determined, in particular, from the wheel speeds determined by wheel speed sensors, and forms the basis of the additionally implemented slip control systems and, if appropriate, braking force distribution systems. As an alternative, a measurement signal can also be received from a wheel axle as a vehicle speed signal v. Furthermore, the anti-tilt control system 2 receives a lateral acceleration signal ay from a lateral acceleration sensor 4 of the vehicle, and a steering wheel angle signal LRW from a steering wheel angle sensor 5 of the vehicle. In block 8 in the anti-tilt control system 2, the tilting limit is estimated from the vehicle mass signal m and an estimated tilting limit signal c1 is output.

Furthermore, in block 9 the tilting dynamics are estimated from the steering wheel angle signal LRW and the vehicle speed signal v; the locked steering wheel angle and the vehicle speed permit the change in the lateral acceleration to be estimated and an estimated tilting dynamics signal c2 to be output. According to this embodiment, the estimation of the tilting dynamics in block 9 does not include the lateral acceleration or the lateral acceleration signal ay, but merely the dynamic change that is to be expected from the steering wheel angle LRW and the vehicle speed v. In this context, the steering wheel angle, which is determined, and the vehicle speed permit sufficiently precise estimation of the expected tilting dynamics in order to subsequently receive the signals c1 and c2 in a comparison device 10 and to compare the tilting limit, which is determined or estimated in block 8, with the tilting dynamics estimated in block 9, wherein the lateral acceleration signal ay is advantageously additionally included in this comparison.

The comparison device 10 therefore compares the tilting angles or tilting torques, which are expected from the lateral acceleration and the tilting dynamics, with the estimated tilting limit, as indicated in FIG. 1 by the plus and minus signs. Device 10 passes on the anti-tilt comparison signal c3, which is generated by the comparison and communicates the risk of tilting or probability of tilting, to an anti-tilt controller 12. Controller 12 subsequently determines the scope of an anti-tilt control process and initiates it by outputting a control signal c4 to a deceleration controller 14 for controlling the deceleration by action of the brake on one or more axles and/or to a controller 15 for the engine torque for setting an engine braking effect. In turn, control signals S1, S2 are output to the respective actuating devices. The scope of the actuation of the controllers 14 and 15 depends on the necessary intervention such as, for example, is also known in the case of actuation of the vehicle brakes or of an engine brake in the case of brake control in the longitudinal direction. According to inventive embodiments, the deceleration controller 14 can act on one of more brakes of the traction vehicle and trailer vehicle; preferably it acts on all the brakes of the traction vehicle and trailer vehicle or trailer.

The yaw control system 3 has a device 16 for determining a yaw setpoint value. Device 16 receives the steering wheel angle signal LRW and the vehicle speed signal v and determines therefrom the yaw setpoint value, which is input by the driver, and outputs the yaw setpoint value as a yaw setpoint value signal vs. During this determination, it is possible in particular to set travel on a circular path with the steering wheel angle lock and the vehicle speed to which a specific yaw rate is assigned. Furthermore, a device 17 for estimating a yaw actual value, i.e., the actual yaw rate of the vehicle about its vertical axis, is provided. Device 17 receives the lateral acceleration signal ay and the vehicle speed signal v and outputs a yaw actual value signal $\psi i$. The yaw control system 3 therefore advantageously primarily determines the yaw behavior of the traction vehicle.

The estimation in the device 17 can take place, in particular, by forming a ratio or quotient of the lateral acceleration signal ay and the vehicle speed signal y, i.e., as ay/v. This is based on the inventive concept that during cornering the yaw rate or the yaw actual value $\psi i$ of the centre of gravity of the traction vehicle is formed by this quotient ay/v, and this value can be used in cases in which no lateral skidding movement is present, i.e., during desired cornering or even in the case of understeering. It can therefore be used for control in the case of understeering of the traction vehicle. Use in the case of an inclination to oversteer or in the case of oversteering, during which a skidding movement with a veering-off of the rear part of the vehicle and front part of the vehicle can take place and therefore the yaw rate of the traction vehicle no longer corresponds to the yaw rate of its centre of gravity, is therefore detected as not being so advantageous and is not carried out according to this embodiment of the present invention.

The yaw setpoint value signal $\psi s$ and the yaw actual value signal $\psi i$ are subsequently output to a comparison device 18, which compares these values with one another. In this context, it is advantageously determined whether the difference between the setpoint value and the actual value exceeds a predefined threshold value. The comparison device 18 outputs a comparison signal c5 to a yaw controller 20, which subsequently actuates, with a control signal c6, a controller 21 for the engine torque and/or a controller 22 for brake slip control per side and/or a brake controller 23 of the trailer, which respectively output control signals S3, S4, S5 to corresponding actuating devices. As a result, the controller is correspondingly actuated for the engine torque and/or the brake as in the anti-tilt control system 2 above. The devices 15 and 21 can also be embodied as a common engine torque controller, which is therefore actuated by the anti-tilt controller 12 or yaw controller 20 depending on the instability that is detected.

The devices 8 to 23 in FIG. 1 are advantageously embodied purely in software terms so that implementation as a program in one or more existing control devices is possible.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for controlling the stability of a vehicle, comprising, using a control device:

effecting anti-tilt control including generating control signals to effect vehicle interventions based on the lateral acceleration, steering wheel angle and speed of the vehicle; and effecting yaw control including determining a yaw rate setpoint value and a yaw rate value estimated based on the lateral acceleration and the vehicle speed, comparing the yaw rate setpoint value and the yaw rate value, and based on the comparison of the yaw rate setpoint value and the yaw rate value, generating control signals to effect vehicle interventions.

2. The method according to claim 1, wherein the yaw rate setpoint value is determined from the steering wheel angle and the vehicle speed.

3. The method according to claim 2, wherein the yaw rate value is estimated from a ratio of the lateral acceleration and the vehicle speed.

4. The method according to claim 2, wherein the vehicle includes a traction vehicle, and wherein effecting yaw control is carried out only when one of understeering of the traction vehicle and an inclination of the traction vehicle to understeer is detected.

5. The method according to claim 4, wherein when the vehicle is traveling on a bend in a roadway and when one of understeering of the traction vehicle and an inclination of the traction vehicle to understeer is detected, further comprising braking a wheel on at least one rear axle of the vehicle on the inside of the bend.

6. The method according to claim 2, further comprising actuating a yaw controller as a function of the comparison of the yaw rate setpoint value signal and the yaw rate value signal.

7. The method according to claim 6, wherein the yaw controller actuates at least one of an engine torque controller and a brake controller.

8. The method according to claim 7, wherein the vehicle includes a traction vehicle and a trailer vehicle coupled to the traction vehicle, and wherein the brake controller is at least one of a brake slip controller and a trailer vehicle brake controller.

9. The method according to claim 1, wherein effecting anti-tilt control further includes estimating a tilting limit of the vehicle based on vehicle mass, and determining at least one of a tilting state, a risk of tilting and a probability of tilting from the estimated tilting limit and tilting dynamics estimated from the steering wheel angle and the vehicle speed.

10. The method according to claim 9, wherein a reference value of a control system is used as the vehicle speed.

11. The method according to claim 10, wherein the control system is one of an anti-lock braking system and an electronic braking system.

12. The method according to claim 9, further comprising actuating an anti-tilt controller based on comparison of the estimated tilting limit with the estimated tilting dynamics.

13. The method according to claim 12, wherein the vehicle includes a traction vehicle and a trailer vehicle coupled to the traction vehicle, and wherein the anti-tilt controller actuates a deceleration controller for at least one brake of the traction vehicle and of the trailer vehicle.

14. The method according to claim 12, wherein the anti-tilt controller actuates an engine torque controller.

15. A vehicle stability control system, comprising:
  an anti-tilt control system configured to (i) receive a lateral acceleration signal from a lateral acceleration sensor, a steering wheel angle signal from a steering wheel angle sensor and a vehicle speed signal, and (ii) generate control signals to effect vehicle interventions based on the lateral acceleration signal, the steering wheel angle signal and the vehicle speed signal; and
  a yaw control system configured to (i) receive the lateral acceleration signal, the steering wheel angle signal and the vehicle speed signal, (ii) determine a yaw rate setpoint value signal and a yaw rate value signal estimated based on the lateral acceleration and the vehicle speed, (iii) compare the yaw rate setpoint value signal and the yaw rate value signal, and (iv) generate control signals to effect vehicle interventions.

16. The stability control system according to claim 15, wherein the yaw control system includes:
  a first device configured to determine the yaw rate setpoint value signal and to receive at least the steering wheel angle signal and the vehicle speed signal;
  a second device configured to determine the yaw rate value signal and to receive at least the lateral acceleration signal and the vehicle speed signal;
  a comparison device configured to receive and compare the yaw rate setpoint value signal and the yaw rate value signal; and
  a yaw controller configured to receive an output signal of the comparison device.

17. The stability control system according to claim 16, wherein the second device is configured to estimate the yaw rate value signal from a ratio of the lateral acceleration and the vehicle speed.

18. The stability control system according to claim 16, wherein the yaw controller is configured to actuate at least one of an engine torque controller and at least one brake controller for effecting a braking intervention.

19. The stability control system according to claim 18, wherein the vehicle includes a traction vehicle and a trailer vehicle coupled to the traction vehicle, and wherein the yaw controller is configured to actuate at least one of a brake slip controller for effecting brake slip control per side of the vehicle and a trailer brake controller of the trailer vehicle.

20. The stability control system according to claim 19, wherein the yaw controller is configured to actuate the brake slip controller to brake a wheel on the inside of a bend of at least one rear axle of the vehicle when at least one of understeering and the tendency of the traction vehicle to understeer is detected.

21. The stability control system of claim 19, wherein the controller for brake slip control acts at a rear axle of the traction vehicle.

22. The stability control system according to claim 16, wherein the vehicle includes a traction vehicle, and wherein the yaw control system is configured to effect yaw control only when at least one of understeering of the traction vehicle and a tendency of the traction vehicle to understeer is detected.

23. The stability control system according to claim 15, wherein the anti-tilt control system is configured to receive a vehicle mass signal.

24. The stability control system of claim 23, wherein the vehicle mass signal is received from a further brake control system.

25. The stability control system of claim 24, wherein the further brake control system is a brake slip control system.

26. The stability control system according to claim 15, wherein the anti-tilt control system includes a first device configured to estimate a tilting limit and to receive a vehicle mass signal; a second device configured to estimate tilting dynamics and to receive the steering wheel angle signal and the vehicle speed signal; a comparison device configured to (i) receive output signals of the first device and the second device, (ii) receive the lateral acceleration signal, and (iii) generate an anti-tilt comparison signal; and an anti-tilt controller configured to receive an anti-tilt comparison signal and to actuate at least one of a brake deceleration controller and an engine torque controller.

27. The stability control system according to claim 26, wherein the vehicle includes a traction vehicle and a trailer vehicle coupled to the traction vehicle, and wherein the deceleration controller is a controller for at least one brake of the traction vehicle and the trailer vehicle.

* * * * *

UNITED STATES PATENT AND TRADEMARK OFFICE
CERTIFICATE OF CORRECTION

PATENT NO.       : 8,483,911 B2  
APPLICATION NO.  : 12/937503  
DATED            : July 9, 2013  
INVENTOR(S)      : Thomas Reich Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Eighth Day of September, 2015

Michelle K. Lee  
*Director of the United States Patent and Trademark Office*